(12) United States Patent
Guimard et al.

(10) Patent No.: US 9,545,989 B2
(45) Date of Patent: Jan. 17, 2017

(54) AIRCRAFT FUSELAGE STRUCTURE COMPRISING AN ENERGY ABSORBING DEVICE

(75) Inventors: Jean-Mathieu Guimard, Paris (FR); Michel Bermudez, Suresnes (FR); Didier Mesnage, Saint Cloud (FR)

(73) Assignee: EUROPEAN AERONAUTIC DEFENCE AND SPACE COMPANY EADS FRANCE, Paris (FR)

( * ) Notice: Subject to any disclaimer, the term of this patent is extended or adjusted under 35 U.S.C. 154(b) by 648 days.

(21) Appl. No.: 13/643,444

(22) PCT Filed: Apr. 22, 2011

(86) PCT No.: PCT/EP2011/056505
§ 371 (c)(1),
(2), (4) Date: Jan. 25, 2013

(87) PCT Pub. No.: WO2011/134917
PCT Pub. Date: Nov. 3, 2011

(65) Prior Publication Data
US 2013/0126674 A1 May 23, 2013

(30) Foreign Application Priority Data

Apr. 30, 2010 (FR) ..................... 10 53347

(51) Int. Cl.
*B64C 1/06* (2006.01)

(52) U.S. Cl.
CPC .................... *B64C 1/062* (2013.01)

(58) Field of Classification Search
CPC .......... B64C 1/062; B64C 1/1461; B64C 1/00; B64C 1/06; B60R 21/045
See application file for complete search history.

(56) References Cited

U.S. PATENT DOCUMENTS

| 2,665,459 A | * | 1/1954 | Lee | 49/483.1 |
| 3,930,665 A | * | 1/1976 | Ikawa | 280/751 |
| 5,096,223 A | * | 3/1992 | Tekelly et al. | 280/748 |

(Continued)

FOREIGN PATENT DOCUMENTS

| CN | 101 596 933 A | 12/2009 |
| EP | 1 426 289 A1 | 6/2004 |

(Continued)

OTHER PUBLICATIONS

International Search Report, dated Sep. 15, 2011, from corresponding PCT application.

*Primary Examiner* — Valentina Xavier
(74) *Attorney, Agent, or Firm* — Young & Thompson (57) ABSTRACT

An aircraft fuselage structure, includes a circumferential reinforcing frame (2) and a plurality of stringers (3) substantially perpendicular to the frame. The frame includes a mechanically weakened area able to cause its localized buckling under the effect of a compressive force exerted circumferentially thereon. The structure includes an energy absorbing device (5) having two effector members (52) secured to the frame respectively on either side of the weakened area, and a central core (51) maintained between the effector members such that a reduction in the distance between the effector members produces a deformation of the central core, which is able to absorb energy under the effect of the deformation.

20 Claims, 3 Drawing Sheets (56) References Cited

U.S. PATENT DOCUMENTS

| | | | |
|---|---|---|---|
| 5,171,510 A * | 12/1992 | Barquet et al. | 264/258 |
| 5,398,889 A * | 3/1995 | White et al. | 244/119 |
| 6,361,092 B1 * | 3/2002 | Eagle et al. | 293/102 |
| 7,338,075 B2 * | 3/2008 | Ellison et al. | 280/752 |
| 8,276,847 B2 * | 10/2012 | Manz | 244/123.1 |
| 2003/0090129 A1 * | 5/2003 | Riley et al. | 296/203.03 |
| 2009/0206202 A1 * | 8/2009 | Bolukbasi | B64C 1/062 |
| | | | 244/121 |
| 2010/0308172 A1 * | 12/2010 | Depeige | 244/132 |
| 2011/0042513 A1 | 2/2011 | Milliere et al. | |
| 2011/0236622 A1 | 9/2011 | Tacke et al. | |
| 2014/0001312 A1 * | 1/2014 | Milliere et al. | 244/121 |

FOREIGN PATENT DOCUMENTS

| | | |
|---|---|---|
| WO | 2009/101372 A1 | 8/2009 |
| WO | WO 2009098374 A2 * | 8/2009 |
| WO | 2010/034594 A1 | 4/2010 |

* cited by examiner

AIRCRAFT FUSELAGE STRUCTURE COMPRISING AN ENERGY ABSORBING DEVICE

This invention relates to an aircraft fuselage structure. More specifically, it relates to such a structure fitted with a device able to absorb the kinetic energy from a stress exerted on a fuselage following an accident, such as a hard landing on land or water, in particular a fuselage made of composite material.

An aircraft fuselage mainly comprises a structure formed of a coating, also called the skin, which is reinforced internally by circumferential reinforcing frames, which are positioned substantially perpendicular to a longitudinal axis of the fuselage, and by stringers, which are arranged substantially perpendicular to said frames.

In an accident or crash with a mainly vertical component, such as for example an emergency landing or a landing gear failure, the lower part of the fuselage is generally the first area of the aircraft subjected to impacts. As a result, it plays an essential role is absorbing the energy of these impacts, which produce a deformation of the frames in the circumferential direction.

The crash certification of aircraft, in particular for passenger transport, imposes criteria concerning the fuselage's behavior in such accident situations.

For fuselages whose structural elements, especially the reinforcing frames and stringers, are made of metallic materials, the energy delivered during a crash is at the present time primarily absorbed by the circumferential reinforcing frames themselves. To this end, there are formed areas of structural weakness in selected positions in these frames. A significant amount of the energy of the impact is thus absorbed by the plastic deformation of the metallic frames in these dedicated areas of weakness. The function of triggering the energy absorption is performed, due to the weakened rigidity of the frames at the areas of weakness, by an articulation of the frames in these preferred areas, and the energy absorption function is performed by yielding of the metal forming the frame.

The constant search to improve aircraft performance involves increasing use of composite materials for the production of structural elements of aircraft fuselages; this is because of the reduction in mass that can be obtained with these composite materials, and because of their well-known performance in terms of mechanical behavior, resistance to fatigue, tolerance to damage, resistance to corrosion and dissipation of energy at the level of the laminate.

Unlike structural elements made of metallic materials, which have an energy absorption capacity due to their intrinsic characteristics of significant plastic deformation, composite materials do not have this capacity for plastic deformation before breaking. Nevertheless, they are potentially capable of providing greater energy absorption than metallic materials as soon as these materials are subjected to different and very energetic failure modes. Therefore, a fuselage structure realized of composite material behaves very differently from a fuselage structure made of metallic material in terms of energy absorption. In response to a crash type of stress, a fuselage structure made of composite material, which is sized with respect to standard static loads, cannot on its own perform the function of absorbing the energy delivered in a crash.

This invention aims to make it possible to reconcile the utilization of composite materials for producing structural elements of aircraft fuselages, and in particular circumferential reinforcing frames, with the crash resistance requirements of such fuselage structures, by satisfying the need to absorb energy due to a crash-type impact.

To this end, an aircraft fuselage structure is proposed according to this invention, comprising a circumferential reinforcing frame, in the form of a profiled section with a concave face, an opposite convex face and two lateral faces, and a plurality of stringers substantially perpendicular to said frame. This structure is wherein the frame comprises a mechanically weakened area able to cause a localized buckling of the frame under the effect of a compressive force exerted circumferentially on the frame. It comprises a device called energy absorbing device comprising two effector members secured to the frame respectively on either side of the weakened area, and a central core maintained between the effector members such that a reduction in the distance between the effector members produces a deformation of said central core. The central core is able to absorb the energy under the effect of said deformation.

According to an advantageous feature of the invention, the mechanically weakened area and the associated energy absorbing device are positioned in a lower part of the frame, i.e. positioned in a lower part of the fuselage structure; the term 'lower' is here defined relative to a normal position of the fuselage in operation and then corresponds to the part of the fuselage structure that is closest to the ground. In an emergency landing type of accident, involving the aircraft's hard impact on a ground surface, it is this lower part of the reinforcing frame that is stressed in the first place. Preferably, the mechanically weakened area is positioned substantially in a longitudinal vertical plane of symmetry of the fuselage.

In preferred embodiments of the invention a plurality, preferably all, of the frames of the fuselage structure are provided with a mechanically weakened area and are each associated to an energy absorbing device according to the invention.

In a crash involving a hard impact on the lower part of the fuselage structure, above the limit of the latter's static load resistance, a significant combined force of compression in the circumferential direction and of bending is exerted on each frame. According to the invention, a localized buckling of the frame is thus triggered in the mechanically weakened area; this causes a lessening of the distance between the effector members of the energy absorbing device secured to the frame respectively on either side of the weakened area. This lessening of the distance tends to deform the central core, which is held locked between the effector members, and the gradual destruction of the latter thus caused then advantageously dissipates the kinetic energy generated in the impact.

In particular, this invention is especially advantageous in the context of fuselage structures where the reinforcing frames are made of composite materials. However, it also applies in a similar way regardless of the material used to make the frame, and in particular for metal frames.

According to preferred embodiments, this invention also meets the following features, implemented separately or in each of their technically possible combinations.

In preferred embodiments of the invention, the energy absorbing device is mainly made of composite materials based on fibers embedded in a polymer matrix.

In variants of the invention, the central core is fixed to the two effector members. The energy absorbing device according to the invention thus participates in the resistance to static loads exercised on the frame when the aircraft is in operation.

In other variants of the invention, the central core is fixed to only one of the two effector members. Therefore there is play between the central core and the second effector member, so that the energy absorbing device according to the invention is then advantageously not stressed during the aircraft's phases of normal operation, for participating in the resistance to the standard static or quasi-static loads exercised on the frame, but only in the event of a hard impact exercised on the latter.

The effector members according to the invention are preferably in the form of rigid plates, which are positioned substantially parallel to each other, so as to extend substantially perpendicularly to the frame and along the longitudinal axis of the fuselage structure. Preferably, these plates are positioned such that one face of each plate substantially coincides with a face called the longitudinal extremity of the absorbing core positioned opposite, so that the reduction in the distance between the effector plates leads to a compression of the central core that is substantially uniform over its entire surface.

According to an advantageous feature of the invention, a first effector member is a rigid plate pierced by through-openings. Preferably, this rigid plate is thus made of a metallic material, preferably a hardened metal. In such a particularly advantageous configuration of the invention, following a hard impact the material forming the central core is progressively ground through the openings of the effector plate against which it is compressed. This thus favors a progressive degradation of the material forming the absorbing central core, which stabilizes and increases the phenomenon of absorption by the core of energy due to this impact.

In preferred embodiments of the invention the through-openings comprise peripheral borders protruding on one face of the plate facing the central core, which advantageously make it possible to initiate the cutting of the central core and consequently reduce the peak force during the contact between the central core and the effector plate.

According to the invention, the two effector members can advantageously respond to such a feature.

In the combination of particularly advantageous features according to the invention, in which a single effector member is fixed to the central core and a single effector member is in the form of a rigid plate pierced by through-openings, these two effector members are preferably different. Thus, the first effector member, defined as the effector member in the form of a plate pierced by through-openings, is preferably not fixed to the central core of the energy absorbing device.

In preferred embodiments of the invention, the effector members are fixed to the frame by means of connecting parts fixed to the frame respectively on either side of the weakened area.

In a variant of the invention, the central core, effector members and connecting parts are made in a single piece. In another also especially advantageous variant, they are independent parts fixed, where necessary, to each other, depending on the particular configuration of the energy absorbing device, by fixing means standard in themselves, for example by gluing or screwing.

According to an advantageous feature of the invention, the energy absorbing device comprises lateral reinforcing elements fixed firstly to the connecting parts and secondly to the fuselage structure's stringer feet.

In preferred embodiments of the invention, the mechanically weakened area is produced by a radial cut-out formed in the frame. This cut-out preferably emerges on the concave face of the frame. Generally, the shape, position on the frame and dimensions of the cut-out are determined by calculations that fall within the competence of the person skilled in the art, in relation to the frame's intrinsic features, so as to ensure the frame's deformation by buckling within thresholds meeting the safety requirements required for given impact features.

Preferably, the cut-out is formed to the right of the center of the energy absorbing device according to the invention.

Any other embodiment of a mechanically weakened area also falls within the framework of the invention, in particular a local reduction in the thickness of the initial frame.

In preferred embodiments of the invention, the central core comprises a three-dimensional network of walls made of composite material. These composite walls advantageously ensure the central core's overall stability against premature buckling and an increased absorption capacity, thanks to their own degradation capacity.

Preferably, foam is interposed between said walls, so that the central core is advantageously provided with an additional source of stabilization. This foam can be of any type known to the person skilled in the art, e.g. an elastomer or polymer foam, preferably closed-cell, open-cell or of a type with alveolar cells, known as honeycomb, made of aluminum or any other material.

The walls can equally well be continuous or non-continuous, depending on whether they are formed of composite laminated plates or by seaming/nailing methods.

The invention also relates to an aircraft comprising a fuselage structure that meets the above features.

A third subject of the invention is an energy absorbing device, designed to take up compressive forces exerted on a circumferential reinforcing frame of an aircraft fuselage structure, which comprises two effector members and a central core maintained between these effector members such that a reduction in the distance between the effector members produces a deformation of said central core; said central core is able to absorb the energy under the effect of this deformation. This device also preferably responds to the features described above, singly or in their technically possible combinations.

The invention will now be described more precisely in the context of preferred embodiments, that are in no way limiting, shown in FIGS. 1 to 11, in which.

Figure 1:
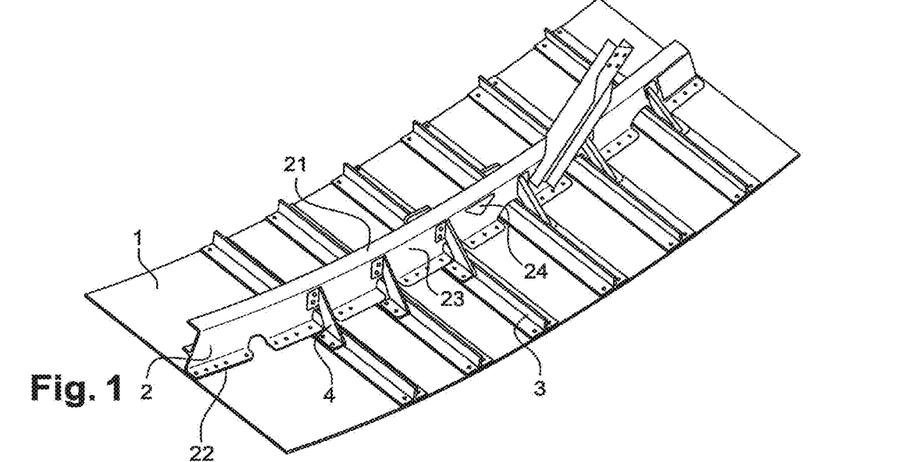
FIG. 1 represents, in a perspective view, a lower part of a section of an aircraft fuselage structure comprising a circumferential reinforcing frame according to the invention.

An aircraft fuselage section typically is in the form of a substantially cylindrical shell. A lower part of such a structure is partially represented in FIG. 1. It comprises, in a conventional way, a coating 1, or skin, reinforced by a plurality of circumferential reinforcing frames 2 extending substantially perpendicular to a longitudinal axis of the structure, evenly distributed over the entire length of the fuselage, and a plurality of stringers 3 fixed to the frames, substantially perpendicularly to the latter, by fixing units 4. FIG. 1 shows only one reinforcing frame 2; the other reinforcing frames are formed in a similar way.

Each reinforcing frame 2 has a shape that substantially corresponds to the local fuselage section, most often circular. It is, according to the invention, in the form of a profiled section comprising a concave face 21, an opposite convex face 22 and two lateral faces 23. The concave face is positioned towards the interior of the fuselage structure.

According to the invention, the frame 2 comprises a mechanically weakened area able to cause localized buckling of the frame under the effect of a compressive force exerted circumferentially on it, e.g. following the fuselage structure's hard impact with a hard surface, such as a ground or water surface. In the preferred embodiment represented in FIG. 1, the weakened area is formed by a radial cut-out 24 formed in the thickness of the frame. Such an embodiment is however in no way restrictive of the invention and any other embodiment of such a weakened area known to the person skilled in the art also falls within the framework of the invention, e.g. a local reduction in the thickness of the initial frame.

This radial cut-out 24 is preferably located on the frame on the concave face 21 side of the latter, and it tapers in the direction of said concave face. According to the embodiments, this cut-out may or may not be extended over the concave face 21. The shape, position on the frame and dimensions of this cut-out are determined by calculations that fall within the competence of the person skilled in the art, according in particular to the features of the material forming the frame, so as to fix the threshold for a local buckling of the frame, which is controlled by this cut-out, to a desired level, which is besides dissociated from the standard static loads for the sizing of the frame.

The fuselage structure according to the invention also comprises an energy absorbing device 5 that is secured to the frame 2, different realization variants of which will be described in detail below with reference to FIGS. 2, 3 and 4, 5, 8 and 9, and which has the main feature of being able to absorb the energy dissipated during a hard compressive force exerted on the frame 2.

Figure 2:
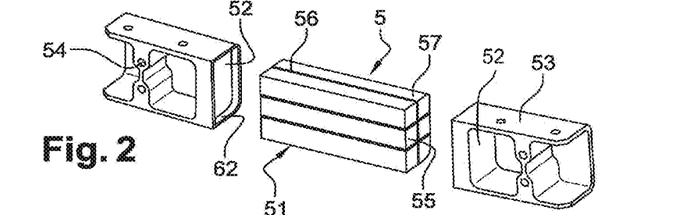
FIG. 2 shows, in an exploded view, an energy absorbing device according to a first embodiment of the invention.

A first example of realization of an energy absorbing device 5 according to the invention is represented in FIG. 2.

This device comprises a central core 51 that is held blocked between two effector members, in the form of rigid plates 52, which are positioned substantially parallel to each other on either side of the core, facing longitudinal extremity faces 55 of the latter.

The plates 52 are fixed to connecting parts 53 designed to be fixed, in particular by screwing, to the frame 2 of the fuselage structure, on either side of the weakened area 24. To this end, the connecting parts 53 comprise holes 54 for the passage of fixing units to the frame 2, in particular of screw type.

Each connecting part 53 preferably forms, beyond the associated effector member 52, a sleeve 62 extending in the direction of the central core 51, in which the latter is partially inserted. When a lateral compressive force is exerted on the device, this sleeve 62 fulfills a function of guiding the central core 51 towards the effector member 52 in the preferred axis of the frame's circumference.

In the embodiment represented in FIG. 2, each plate 52 is made in a single piece with the associated connecting part 53. The whole is preferably made of composite material. These constituent elements of the device 5 can also be fixed to each other, by any fixing means standard in itself.

The central core 51 can be secured, depending on the configurations, to one or both of these plates 52 and/or connecting parts 53. It can also be made in a single piece with some or all of these elements, or be in the form of a separate piece. In this last configuration, it can be fixed to these elements by any means known to the person skilled in the art, especially by gluing.

The rigid plates 52 are preferably configured and sized so that the surface facing the central core coincides at least substantially with the surface of the longitudinal extremity face 55 of this core.

The central core 51 of the energy absorbing device according to the invention can have a variety of shapes.

In the preferred embodiment illustrated in FIG. 2, it comprises a three-dimensional network of continuous walls 56, which are interposed between foam bars 57. This foam can be of any type. In particular it can be an elastomer or polymer foam, preferably closed-cell or open-cell, or any other type of foam, e.g. a foam with alveolar cells, known as honeycomb, made of aluminum or any other material; it is understood that, in the context of implementation on an aircraft, the lightest materials are especially preferred. In the particular example of realization that is the subject of FIG. 2, there are three inner walls 56 and six foam bars; however, the invention is in no way limited to such numbers.

Figures 3, 4:
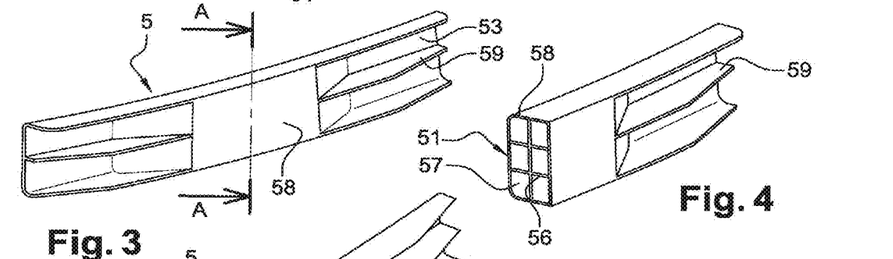
FIG. 3 illustrates, in a perspective view, an energy absorbing device according to a second embodiment of the invention.
FIG. 4 shows the device of FIG. 3 cut along plane A-A.

In a second variant of the absorbing device 5 according to the invention, illustrated in FIG. 3, the central core, effector members and connecting parts are made in a single piece. The central core is integrated into an outer skin made of composite material 58. Fins 59 stiffen the device on each part, at the fixing parts 53, either side of the central core. As shown in FIG. 4, in cross-section along plane A-A, the central core 51 included in the outer skin 58 is formed in a similar way to the central core described above with reference to FIG. 2. It includes the inner walls 56 and foam bars 57.

Figure 5:
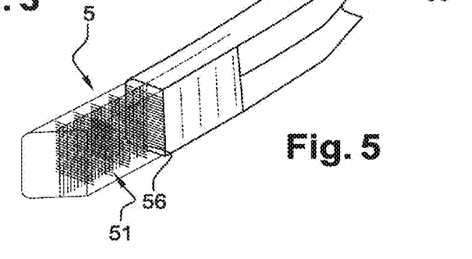
FIG. 5 represents a partial view of an energy absorbing device according to a third embodiment of the invention, in which the inner part of the central core is partially illustrated in a cutaway view.

A third variant of an absorbing device 5 according to the invention is illustrated in FIG. 5. The device represented in it is made in a single piece. The central core 51, partially represented in a cutaway view, is devoid of foam bars. The inner walls 56 are non-continuous. Such an embodiment advantageously provides high control of the dissipation of energy during the destruction of the core, including in modes of complex stresses.

Generally, the presence of foam in the central core offers the advantage of better stability for the latter by limiting the local buckling of the walls, and thus of producing a degradation mode with a high level of energy dissipation for the central core. The embodiments of the absorbing device according to the invention in which the central core is a hollow skeleton, with no foam included, are more advantageous in terms of mass. The choice between one or other of these variants is within the scope of the person skilled in the art, who will take into account in particular the specific requirements laid down for each given type of aircraft.

As examples, methods of manufacturing the energy absorbing device 5 according to the invention are described below. In general, these manufacturing methods make use of technologies that utilize composite materials.

According to a first manufacturing method, utilizing the technology known as RTM, for Resin Transfer Molding, which is especially suited to forming parts with complex geometries, simple unit preforms made of fiber-based material, in particular carbon fibers, are assembled together to form an evolved structure. The assembly of these elements is then integrated into an air-tight mold in order to inject a resin, in particular an epoxy type of resin. The resin is polymerized, in a way that is standard in itself, in an oven or under a hot press.

In the case of central cores that include foam bars, these bars are wrapped by continuous unidirectional plies of fibers, woven or braided, prior to the injection of resin. Depending on the desired configurations for the device, the assembly can be laid up with external plies so as to form the outer skin 58; where appropriate, in the case of an absorbing device made in a single piece, these plies take part in forming effector members 52 and connecting parts 53.

In general, the number and orientation of the plies are chosen according to calculations within the scope of the person skilled in the art, so as to optimize the energy absorption and desired stress distribution performances in operation of the device according to the invention.

In the context of the invention, closed-cell foams are especially preferred since this ensures that resin will not penetrate into the foam during the resin injection. However the invention also applies to open-cell foams. It is then advantageously provided during manufacture, prior to the injection of resin, that a protection layer impervious to resin is interposed between the foam and the fiber plies.

According to a second manufacturing method, aimed at forming an energy absorbing device with non-continuous inner walls, these inner walls are formed by seaming or nailing. In the case of seaming, bands formed from continuous fibers, dry or pre-impregnated with resin, are thus driven through a foam block. In the case of nailing, nails made of a composite or metallic material, such as pins formed from continuous fibers and polymerized resin, are driven through a foam block. The transverse reinforcements thus obtained form non-continuous inner walls. After injecting the resin, in the context of the implementation of an RTM method, the resin is then polymerized in a way that is standard in itself. In the case where the absorbing device is made in a single piece, this polymerization is advantageously carried out at the same time as that of the resin used in making the connecting parts and effector members. Such a manufacturing method notably has the advantage of great flexibility in terms of angle of orientation given to the walls inside the foam block, which enables better adaptation to the specific requirements of each given fuselage structure.

When one wishes to obtain a central core in the form of a hollow skeleton with non-continuous walls, the invention advantageously provides for a block of a material with dissolution properties, in which the nails are inserted, to be utilized for manufacture in place of the foam block. The manufacturing method thus comprises, after or at the same time as the step performing the polymerization of the resin, a processing step aimed at dissolving this material so as to obtain the desired hollow skeleton.

In particular, the manufacturing methods described above are especially advantageous in that they can be implemented at low cost while allowing functional elements, such as the connecting parts, to be integrated into the device, so that the number of different elements to be manufactured can be limited and assembly times reduced. The internal architecture of the central core can also be easily optimized in terms of the number of plies, layup, cross-section, according to the desired response to stresses in absorption operation.

The energy absorbing device 5 can also be manufactured in any other way known to the person skilled in the art. In particular, it can be made from pultruded profiled elements, hollow or filled with foam, so as to satisfy the requirements of implementation of industrial and mass production processes.

The absorbing device 5 according to the invention can equally well be fixed to the frame 2 during the latter's manufacturing process, off the fuselage structure assembly line, or after this assembly.

Figure 6:
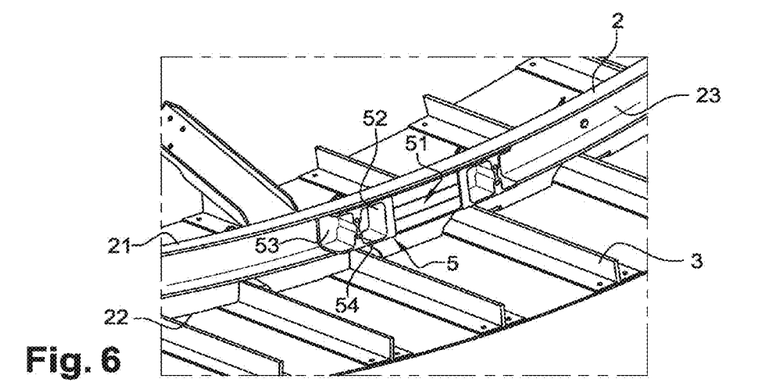
FIG. 6 shows the device of FIG. 2 fixed on the frame of FIG. 1.

This device 5 is shown in FIG. 6 assembled to a lower part of the frame 2. In the preferred embodiment of the invention illustrated in this figure, it is positioned against the lateral face 23 of the frame, so as to extend circumferentially, and so that the effector members 52 are positioned either side of the cut-out 24 formed in the frame 2. Preferably, the device is positioned so that this cut-out 24, which is not shown in this figure, is located substantially to the right of a centerline of the device extending between the convex face 22 and concave face 21 of the frame.

The absorbing device 5 is fixed to the frame 2 via connecting parts 53, by fixing units that are standard in themselves, inserted through the holes 54 of the connecting parts and secured to the frame 2.

Figure 7:
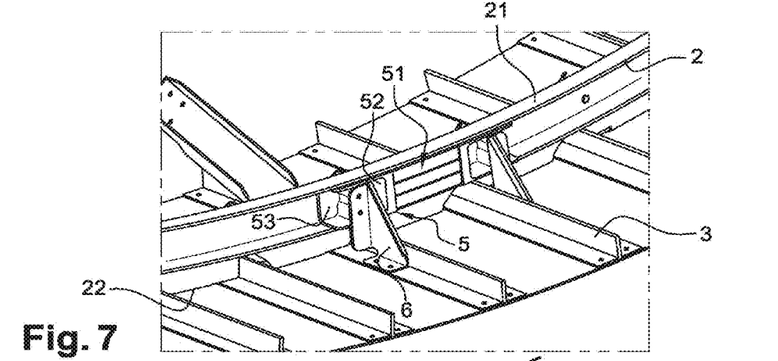
FIG. 7 represents the frame of FIG. 6 completed by lateral reinforcing elements according to the invention.

In preferred embodiments of the invention, as illustrated in FIG. 7, lateral reinforcing elements 6 are also provided, each respectively fixed firstly to a connecting part 53, and secondly to a foot of a stringer 3 positioned substantially facing said connecting part. To this end, it is advantageously provided according to the invention that the gap between the connecting parts is substantially equal to the gap between two stringers 3 of the fuselage structure, and that the absorbing device is positioned on the frame 2 such that each connecting part 53 coincides substantially with a stringer.

The lateral reinforcing element 6 is preferably fixed to the connecting part via the holes 54, by the same fixing unit(s) as those used for fixing the connecting part 53 to the frame 2. Thus, this fixing unit, notably a screw, links the lateral reinforcing element 6 to the frame 2 through the connecting part 53.

The lateral reinforcing elements 6 advantageously allow the absorbing device 5 to remain in the alignment of the frame 2 as long as possible when a hard compressive force in the circumferential direction is exerted on it.

When the aircraft is in operation, the fuselage structure according to the invention behaves as follows.

Under normal operating conditions for the aircraft, depending on its configuration, as it has been described above, the absorbing device 5 can participate or not in plastic resistance to standard quasi-static loads corresponding to the normal stresses encountered by the frame. In particular, in the particularly advantageous configuration in which the central core 51 is not fixed to at least one of the effector members 52, it does not participate in this.

Figure 11:
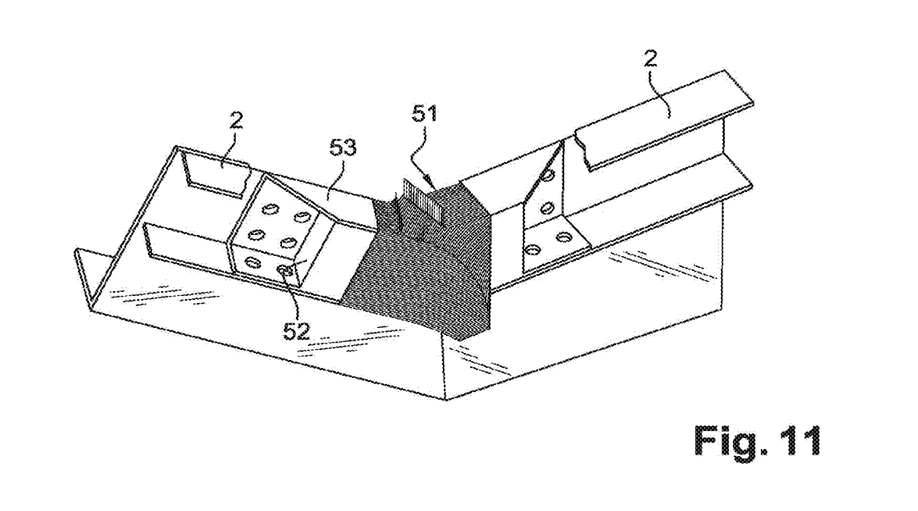
FIG. 11 schematically represents an area of a circumferential frame equipped with an energy absorbing device according to the invention, deformed following an impact exerted on the fuselage structure.

In a crash, when the frame 2 is subjected to a hard impact, a mainly circumferential compressive force is exerted on the frame. According to the invention, localized buckling of the frame 2 is then provided, through the cut-out 24 formed in the frame 2, in the area in which the absorbing device 5 is fixed; this has the effect of triggering the absorption of energy by the device. This is then compressed laterally, as illustrated in FIG. 11, and the distance between the two effector members 52 is lessened. The central core 51, held between said effector members, is progressively deformed and degraded, thus absorbing the energy generated in the impact.

Figures 8, 9:
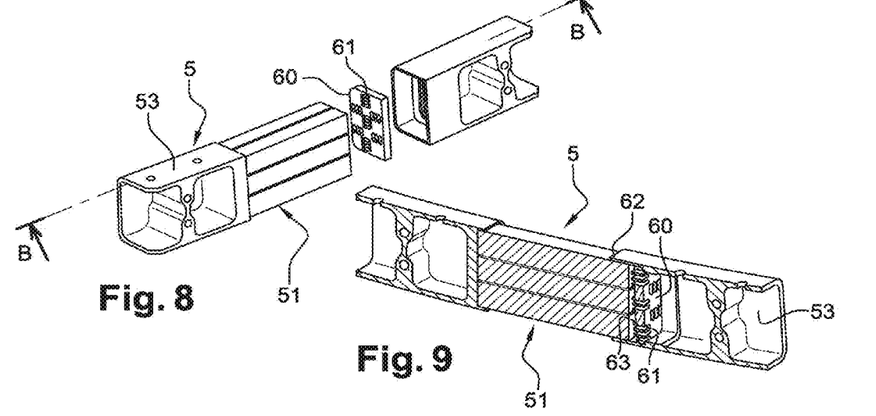
FIG. 8 shows, in a partially exploded view, an energy absorbing device according to a fourth embodiment of the invention.
FIG. 9 shows the device of FIG. 8 in cross-section along plane B-B.

FIG. 8 presents a fourth realization variant of the absorbing device 5 according to the invention, derived from the first variant shown in FIG. 2. According to this variant, one of the effector members 52 is in the form of a rigid plate 60 pierced by through-openings 61. In accordance with the invention, this effector member 60, which can be made of a material with a high degree of rigidity, notably a hardened metal, is not fixed to the central core 51. It is positioned such that the through-openings 62 extend transversally to the central core 51, as shown in FIG. 9. The absorbing device also comprises means of guiding the central core towards the rigid plate 60. These guiding means are notably formed, in the preferred embodiment of the invention shown in this FIG. 9, by an extension of the sleeve 62 of the connecting part beyond the rigid plate 60, inside which the core is partially engaged.

The through-openings 61 preferably also comprise peripheral borders 63 protruding on one face of the plate 60 positioned facing the central core 5.

This absorbing device 5 can be assembled on the frame 2 as described previously, as shown in FIG. 10. In this figure, tabs 7 providing additional fixing of the connecting parts 53 to the frame 2, at the concave face 21 of the frame, are also represented. These connecting tabs 7 are preferably also fixed to the units 4 fixing the frame 2 to the stringers 3 (which are not visible in FIG. 10).

Figure 10:
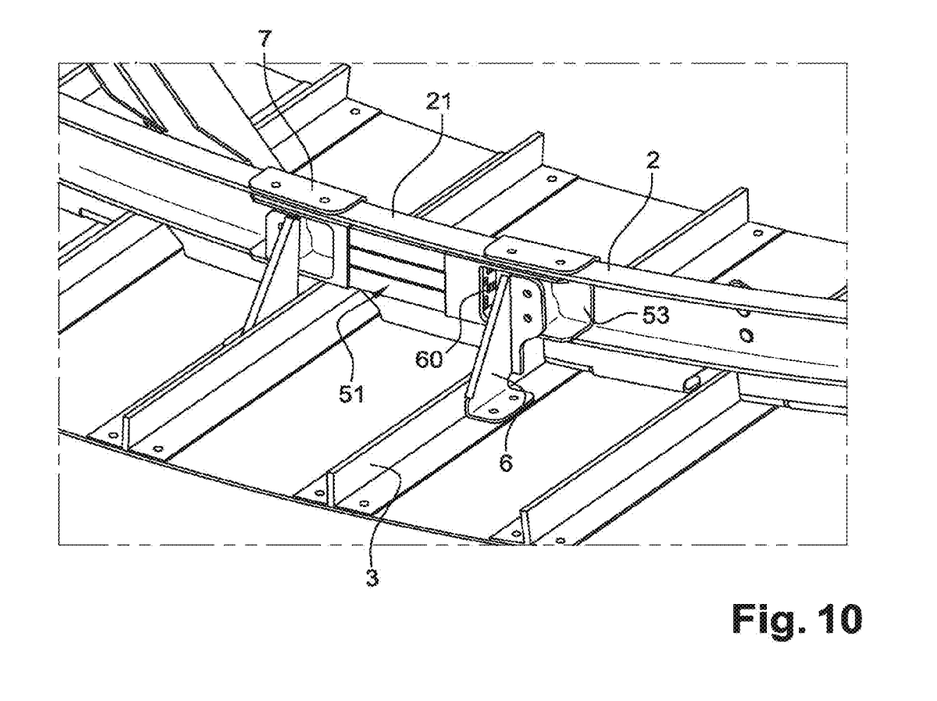
FIG. 10 shows the device of FIG. 8 fixed on the frame of FIG. 1.

In such an advantageous configuration of the invention, when the distance between the effector members 52 is lessened as a result of the local buckling of the frame in this area, the material forming the central core 51, guided towards the rigid plate 60, is ground through the openings 61 of the latter, which advantageously increases the energy absorption by the device according to the invention. The protruding borders 63 also advantageously make it possible to initiate the cutting of the central core 51, more specifically of the inner walls 56, and consequently reduce the peak force during contact between the central core 51 and the rigid plate 60.

The above description clearly illustrates that, through its various features and their advantages, the present invention realizes the objectives it set itself. In particular, it provides an aircraft fuselage structure that comprises an energy absorbing device having a passive core with an intrinsic degradation capacity, associated to a circumferential reinforcing frame, which meets the crash resistance requirements by satisfying the need to absorb energy due to this crash, even when this structure is made of composite material. The energy absorbing device according to the invention is also simple, quick and inexpensive to manufacture and assemble on the fuselage structure.

The energy absorbing device according to the invention can also find similar application in other fields, e.g. in the automobile manufacturing field, in which it can notably be associated to a frame that is not circumferential but straight, and to which it can be adapted by minor structural modifications within the scope of the person skilled in the art, while retaining the same advantageous function.

The invention claimed is:

1. An aircraft fuselage structure, comprising:
a reinforcing circumferential frame having a curved portion with a concave face and an opposite convex face;
a plurality of stringers substantially perpendicular to said circumferential frame,
wherein said circumferential frame comprises a mechanically weakened area that causes a localized buckling of the frame under the effect of a compressive force exerted on said frame in the circumferential direction; and
an energy absorbing device comprising i) a first effector member and a second effector member, each of the first effector member and the second effector member being secured to the curved portion of said circumferential frame respectively on either side of the weakened area with the first effector member secured to the curved portion of said circumferential frame at a first side of the weakened area, and the second effector member secured to the curved portion of said circumferential frame at a second side of the weakened area, opposite said first side, and ii) a central core maintained between said first and second effector members such that a reduction in a distance between said first and second effector members produces a deformation of said central core, with said central core absorbing energy under an effect of said deformation,
wherein the central core is held blocked between first and second effector members, each of the first and second effectors members being comprised of a rigid plate, each rigid plate facing a respective longitudinal extremity face of the central core.

2. The aircraft fuselage structure according to claim 1, wherein the central core is fixed to the first and second effector members.

3. The aircraft fuselage structure according to claim 1, wherein the central core is fixed to only one of the first and second effector members.

4. The aircraft fuselage structure according to claim 1, wherein the rigid plate of the first effector member is pierced by through-openings.

5. The aircraft fuselage structure according to claim 4, wherein said first effector member is not fixed to the central core of the energy absorbing device.

6. The aircraft fuselage structure according to claim 1, wherein the first and second effector members are fixed to the curved portion of the frame by connecting parts fixed to the frame respectively on either side of said weakened area.

7. The aircraft fuselage structure according to claim 6, wherein the central core, effector members and connecting parts are made in a single piece.

8. The aircraft fuselage structure according to claim 6, wherein the energy absorbing device further comprises lateral reinforcing elements fixed firstly to the connecting parts and secondly to stringers of said fuselage structure.

9. The aircraft fuselage structure according to claim 1, wherein the mechanically weakened area comprises a radial cut-out formed in the frame, said cut-out located within the curved portion of said circumferential frame and extending from the concave face towards the convex face.

10. The aircraft fuselage structure according to claim 1, wherein the central core comprises a three-dimensional network of inner walls made of composite material.

11. The aircraft fuselage structure according to claim 10, wherein foam is interposed between said inner walls.

12. The aircraft fuselage structure according to claim 1, wherein said mechanically weakened area and the energy absorbing device are positioned in a lower part of said structure.

13. The aircraft comprising a fuselage structure according to claim 1.

14. The aircraft fuselage structure according to claim 2, wherein the rigid plate of the first effector member is pierced by through-openings.

15. The aircraft fuselage structure according to claim 3, wherein the rigid plate of the first effector member is pierced by through-openings.

16. The aircraft fuselage structure according to claim 7, wherein the energy absorbing device comprises lateral reinforcing elements fixed firstly to the connecting parts and secondly to stringers of said fuselage structure.

17. The aircraft fuselage structure according to claim 1, further comprising:
the skin reinforced by said circumferential reinforcing frame, said circumferential reinforcing frame being one frame of plural frames extending substantially perpendicular to a longitudinal axis of the structure, each frame having a shape that matches a curved and closed line that delimits a circumference of the aircraft fuselage,
wherein i) a first of the first and second effector members of the energy absorbing device of said circumferential reinforcing frame is fixed to a first side of the weakened area and ii) a second of the first and second effector members of the energy absorbing device of said circumferential reinforcing frame is fixed to a second side of the weakened area, opposite the first side, and
wherein the compressive force being exerted on said circumferential reinforcing frame in the circumferential direction triggers the localized buckling in the mechanically weakened area of said circumferential reinforcing frame such that the first and second effector members come closer to one another, and the first and second effector members coming closer to one another causes the deformation of the central core maintained between the first and second effector members such that the central core absorbs the energy generated by the compressive force exerted on the frame.

18. The aircraft fuselage structure according to claim 1, wherein the central core is located between the concave face and the opposite convex face of the curved portion of the circumferential frame.

19. An aircraft fuselage structure, comprising:
a reinforcing circumferential frame having a curved portion with a concave face and an opposite convex face;
a plurality of stringers substantially perpendicular to said circumferential frame,
wherein said circumferential frame comprises a mechanically weakened area that causes a localized buckling of the frame under the effect of a compressive force exerted on said frame in the circumferential direction; and
an energy absorbing device comprising i) a first effector member and a second effector member, each of the first effector member and the second effector member being secured to the curved portion of said circumferential frame respectively on either side of the weakened area with the first effector member secured to the curved portion of said circumferential frame at a first side of the weakened area, and the second effector member secured to the curved portion of said circumferential frame at a second side of the weakened area, opposite said first side, and ii) a central core maintained between said first and second effector members such that a reduction in a distance between said first and second effector members produces a deformation of said central core, with said central core absorbing energy under an effect of said deformation,
wherein the central core is located between the concave face and the opposite convex face of the curved portion of the circumferential frame.

20. An aircraft fuselage structure, comprising:
a reinforcing circumferential frame having a curved portion with a concave face and an opposite convex face;
a plurality of stringers substantially perpendicular to said circumferential frame,
wherein said circumferential frame comprises a mechanically weakened area that causes a localized buckling of the frame under the effect of a compressive force exerted on said frame in the circumferential direction; and
an energy absorbing device comprising i) a first effector member and a second effector member, each of the first effector member and the second effector member being secured to the curved portion of said circumferential frame respectively on either side of the weakened area with the first effector member secured to the curved portion of said circumferential frame at a first side of the weakened area, and the second effector member secured to the curved portion of said circumferential frame at a second side of the weakened area, opposite said first side, and ii) a central core maintained between said first and second effector members such that a reduction in a distance between said first and second effector members produces a deformation of said central core, with said central core absorbing energy under an effect of said deformation,
wherein the first and second effector members are fixed to the curved portion of the frame by connecting parts fixed to the frame respectively on either side of said weakened area, and
wherein the energy absorbing device further comprises lateral reinforcing elements fixed firstly to the connecting parts and secondly to stringers of said fuselage structure.

* * * * *